United States Patent [19]

Scanley

[11] Patent Number: 5,250,586
[45] Date of Patent: Oct. 5, 1993

[54] METHOD FOR THE PRODUCTION OF FINELY DIVIDED WATER SOLUBLE POLYMERS

[76] Inventor: Clyde S. Scanley, 330 Speedwell Ave., Morristown, N.J. 07960

[21] Appl. No.: 849,532

[22] Filed: Mar. 11, 1992

Related U.S. Application Data

[60] Division of Ser. No. 344,770, Apr. 28, 1989, Pat. No. 5,155,156, which is a continuation-in-part of Ser. No. 206,804, Jun. 15, 1988, abandoned.

[51] Int. Cl.$^5$ .............................................. C08K 11/00
[52] U.S. Cl. .................................... 523/129; 523/334; 523/343; 523/353; 524/555
[58] Field of Search ............... 523/353, 129, 334, 343; 524/555

[56] References Cited

U.S. PATENT DOCUMENTS

| | | | |
|---|---|---|---|
| 3,284,393 | 11/1966 | Vanderhoff et al. | 526/207 X |
| 3,532,663 | 10/1970 | Nicks et al. | 523/353 |
| 3,624,019 | 11/1971 | Anderson et al. | 524/555 X |
| 3,734,873 | 5/1973 | Anderson et al. | 523/336 |
| 3,826,771 | 7/1974 | Anderson et al. | 524/827 X |
| 3,862,078 | 1/1975 | Burke, Jr. | 523/353 |
| 4,052,363 | 10/1977 | Scanley | 524/555 X |
| 4,090,992 | 5/1978 | Scanley | 524/555 X |
| 5,095,058 | 3/1992 | Smith et al. | 524/238 |

Primary Examiner—Joseph L. Schofer
Assistant Examiner—J. M. Reddick
Attorney, Agent, or Firm—Lerner, David, Littenberg, Krumholz & Mentlik

[57] ABSTRACT

A composition including an oil and particles of a solid, water soluble flocculant polymer substantially immiscible with the oil provides ready dispersibility of the polymer in aqueous fluids. Desirably, the composition is substantially free of surfactants, the polymer particles have a mean particle size less than about 100 microns and preferably less than about 20 microns and the polymer particles are substantially dry.

17 Claims, No Drawings

METHOD FOR THE PRODUCTION OF FINELY DIVIDED WATER SOLUBLE POLYMERS

This is a division, of application Ser. No. 07/344,770, filed Apr. 28, 1989 which is a continuation in part of application Ser. No. 07/206,804 filed on Jun. 15, 1988 the disclosure of which is incorporated by reference herein.

Water soluble polymers of the type commonly referred to as "flocculants" are used in industry to enhance various physical and chemical processes. For example, water soluble flocculant polymers are used to provide coagulation of fine particles in aqueous suspensions for sedimentation and filtration in the paper processing and sewage treatment industries. Also, such flocculant polymers can be used as stabilizers for suspensions referred to as "drilling mud" employed in well drilling operations. Further, flocculant polymers can be employed in the fluids used in the so-called water-flooding process for recovery of petroleum from substantially exhausted wells. Most of these industrial processes are large scale operations involving treatment of hundreds or thousands of cubic meters of aqueous fluids at a time and requiring dissolution of substantial amounts of the aqueous polymer.

In these applications, it is important to provide the water soluble polymer in a physical form which will disperse and dissolve rapidly in an aqueous fluid when the polymer is added to the aqueous fluid. For example, U.S. Pat. No. 3,122,203 of Hawkins teaches the use of aqueous polymers in an aqueous well-washing fluid and notes the difficulties encountered in attempts to dissolve the "dry powdered or flaked polymer product of commerce", i.e., the substantially pure polymers. As disclosed by Hawkins ,'203 the pure polymers typically dissolve slowly and require vigorous agitation to promote dissolution. To avoid these difficulties, the Hawkins ,'203 patent provides a finely divided water soluble polymer in an anhydrous, organic liquid together with a "surface active dispersing agent" or surfactant. When the dispersion with the surfactants is added to an aqueous fluid, the polymer dissolves readily.

Vanderhoff et al., U.S. Pat. No. 3,284,393 is directed toward preparation of the water soluble polymers per se rather than toward preparation of these polymers in any particular physical form suitable for rapid dissolution. As described in Vanderhoff et al. '393, various water soluble polymers can be formed by a water-in-oil emulsion polymerization process. In such a process, a monomer is dispersed in an aqueous phase of a water-in-oil emulsion, which emulsion is stabilized by water-in-oil emulsifying agents or surfactants. While the monomer is in this emulsion, it is polymerized. The polymerization thereby yields a suspension or "latex" of very fine, typically water-swollen polymer particles dispersed in the non-aqueous oil phase of the emulsion. The Vanderhoff '393 patent discloses that the polymer so formed can be recovered by physical separation from the oil phase and washing with various solvents to remove, inter alia, the emulsifier used in the process. As Vanderhoff '393 is concerned with preparation of the polymer per se, rather than with preparation of a particularly dispersable form for such a polymer, the patent does not report the physical condition or dispersability of the pure polymers resulting from its washing stages. Typically, however, such a procedure is known to yield agglomerated, caked polymer which is difficult to dissolve.

Anderson et al., U.S. Pat. Nos. 3,624,019; 3,734,873; 3,826,771 and Re-issue 28,474 are directed generally to a rapid dissolution of a water soluble polymer in an aqueous fluid by a technique now referred to as "inversion". In the inversion technique, the water soluble polymer is provided in the aqueous phase of a water-in-oil emulsion, which emulsion is stabilized by a water-in-oil surfactant. Such an emulsion may be prepared either by dispersing an aqueous solution of a pre-existing polymer or by using a water-in-oil emulsion polymerization technique as taught by Vanderhoff '353. According to the Anderson patents, such an emulsion, if stabilized with appropriate water-in-oil emulsifying agents, will remain relatively stable. The stabilized emulsion can be mixed with an aqueous fluid and then "inverted" so as to disperse the polymer from the emulsion into the aqueous fluid. During the inversion step, a further hydrophilic surfactant is added to the system, preferably as part of the aqueous fluid rather than as part of the emulsion. This approach suffers from several significant drawbacks including, inter alia, limits on the stability on the original emulsions, the need for separate handling of the hydrophilic surfactant and the emulsion and the costs of all of the surfactants involved. In the approach taught by the Anderson et al. patents, the hydrophilic surfactant often cannot be added to the emulsion prior to use because addition of the hydrophilic surfactant tends to promote agglomeration of the polymer, rendering the product difficult or impossible to disperse in the aqueous fluid.

As disclosed in U.S. Pat. Nos. 4,052,353 and 4,090,992 of Clyde S. Scanley, dispersions of water soluble polymers in oils can be substantially stabilized against agglomeration by removing water from the polymer-bearing aqueous phase so that the water content of this phase is below a certain limit, typically less than about 40% and most preferably less than about 15% by weight. As further taught in the '353 and '992 patents, the stabilization imparted by reducing the water content permits addition of surfactants, such as the hydrophilic surfactants which would otherwise lead to agglomeration. Thus, according to one process taught by these patents, a water-in-oil emulsion incorporating a water soluble polymer in the aqueous phase is treated by distillation to reduce the water content of the aqueous phase to a level at which the polymer is substantially stable against agglomeration. A further, substantially hydrophilic surfactant is added to the dispersion. This product, despite the addition of hydrophilic surfactant is stable during storage and handling. The polymer can be dissolved readily in an aqueous fluid simply by adding the surfactant-bearing dispersion to the fluid. There is no need to add a separate surfactant to the aqueous fluid. Stated another way, the dispersion of polymer in oil, with the emulsifier or water-in-oil surfactant, is rendered "self-water-dissolving" by addition of the further surfactant. The '353 and '992 patents thus represent a major advance in the art. The surfactant-bearing dispersions eliminate all of the difficulties associated with separate handling and mixing of the additional surfactant utilized in the Anderson patents and further provide excellent stability against agglomeration. Nonetheless, this approach still relies upon the use of surfactants present at the time of polymer addition to the aqueous fluid to promote rapid dissolution of the polymer. Thus, the technique disclosed in the '353 and '992 patents still incurs the costs associated with the surfactants. The surfactants employed according to the prior methods ultimately are incorporated in the aqueous fluid along with the polymer. The surfactants thus contaminate the fluid, posing problems in certain applications and requiring careful selection of surfactants to minimize any undesirable effects of the surfactants. Accordingly, prior to the present invention there have been substantial, unmet needs for still further improvements.

SUMMARY OF THE INVENTION

One aspect of the present invention provides a composition including an oil and particles of a solid, water soluble flocculant polymer substantially immiscible with the oil and substantially non-reactive with the oil, the polymer particles being in admixture with the oil. The polymer particles are desirably substantially dry and hence substantially stable against agglomeration. The composition preferably is substantially free of surfactants. The polymer particles desirably have a mean particle size less than about 100 microns and preferably less than about 20 microns. Preferred compositions according to this aspect of the invention are substantially self-dissolving in water. That is, the dissolution time of the composition, as measured by the test method described below is less than about 30 minutes, desirably less than about 10 minutes and most desirably less than about 3 minutes. The polymer desirably is a polyamine or a vinyl polymer having polar functional groups, and preferably has a molecular weight of at least 100,000 Daltons. The polymer particles should contain no more than about 40% water, desirably no more than about 15% water and more desirably no more than about 10% water based on the weight of the polymer. In the preferred compositions according to this aspect of the present invention, the polymer particles are substantially evenly dispersed in the oil. Despite the absence of surfactants the preferred compositions according to this aspect of the present invention are remarkably stable against settling or agglomeration of the polymer.

The preferred compositions according to this aspect of the present invention incorporate the discovery that water soluble polymers finely dispersed in oil will readily dissolve in aqueous fluids in the absence of surfactants. These preferred compositions provide desirable dispersability characteristics without the costs associated with the surfactants heretofore believed necessary to provide such characteristics. Moreover, compositions according to this aspect of the present invention can be employed without surfactant contamination of the aqueous fluid.

A further aspect of the present invention provides methods of dissolving water soluble polymers in aqueous fluids. Methods according to this aspect of the present invention include the step of mixing a composition as aforesaid with an aqueous fluid so that the polymer in the composition is dissolved in the aqueous fluid. Desirably, the mixing step is conducted in the absence of surfactants. The aqueous fluid may be a suspension of water insoluble particles in an aqueous medium such as papermaking stock, sewage or industrial wastes and the amount of polymer-bearing composition may be selected so as to provide the water soluble polymer in amounts sufficient to promote flocculation of the insoluble particles. Methods according to this aspect of the invention provide advantages similar to those discussed above in connection with the compositions, in that they provide rapid dissolution of the polymer in the aqueous fluid without the expense and contamination associated with the surfactants.

Yet another aspect of the present invention provides methods of making dispersions of water soluble polymers in oils. Methods according to this aspect of the present invention desirably incorporate the step of providing a first dispersion of particles of the polymer in a first oil substantially immiscible with and substantially non-reactive with the polymer. This first dispersion incorporates a surfactant, typically a water-in-oil emulsifier. The polymer particles in the first dispersion desirably are substantially dry and hence resistant to agglomeration. The method further includes the step of converting the first dispersion into a second dispersion of polymer particles in an oil substantially immiscible and non-reactive with the polymer. This second dispersion desirably is substantially devoid of surfactants. Preferably, the converting step includes the steps of separating the first oil from the polymer particles so that the first surfactant is carried away from the polymer particles by the first oil and forming the second dispersion by dispersing the separated polymer particles in a second oil. The first oil, containing the first surfactant separated from the polymer particles may be reused and recycled within the process.

These and other objects, features and advantages of the present invention will be further apparent from the detailed description of the preferred embodiments set forth below.

DETAILED DESCRIPTION OF THE PREFERRED EMBODIMENTS

A composition in accordance with one embodiment of the present invention preferably includes an oil and particles of a solid, water soluble flocculant polymer immiscible with the oil. The term "flocculant" is commonly used as referring to additives for aqueous systems. Typically, flocculants can be used to promote separation particles from an aqueous fluid and to promote coagulation of particles for filtration from an aqueous fluid. Also, flocculants can be used as thickeners to increase the viscosity of an aqueous fluid. Further, flocculants can be used as an aid to pigment retention, paper formation or both in papermaking processes, and to provide enhanced strength in a paper made by deposition of fibers from an aqueous suspension. As used in this disclosure, the term "flocculant polymer" refers to a polymer which has properties suitable for industrial scale use in any of these processes.

The flocculant polymer in the composition desirably has a molecular weight of at least about 100,000 Daltons and more preferably between about 100,000 Daltons and about $25 \times 10^6$ Daltons. The flocculant polymer desirably is selected from the group consisting of vinyl polymers having polar functional groups and polyamines. Thus, the polymer may be a vinyl homopolymer or copolymer of a monomer having one or more functional groups selected from the group consisting of hydroxyl, carboxyl, polyether, sulfonate, amide, amine, quarternary ammonium and the salts and derivatives of the foregoing groups. Such a vinyl polymer may incorporate two or more different monomers each having such polar functional groups. Among the suitable monomers, but not limited thereto, are acrylamide, acrylic acid, 2-sulphoethyl acrylate, sodium vinylbenzyl sulfonate, vinylbenzyl trimethyl ammonium halides such as vinylbenzyl trimethyl ammonium chloride, diallyldimethyl ammonium halides such as diallyldimethyl ammonium chloride, styrene sulfonates such as sodium styrene sulfonates; salts of di- and tri-alkylaminoalkyl acrylate and methacrylate such as the salts of di- and tri-alkylaminoethyl acrylate and methacrylate; and salts of di- and tri-alkylaminoalkyl acrylamide and methacrylamide, such as the salts of di- and tri-alkylaminoethyl acrylamide and methacrylamide.

The polyamines may incorporate polar functional groups such as those discussed above in connection with the vinyl polymers which polar functional groups may be present as substituents on the fundamental polyamine chain. Thus, the monomers incorporated in such a polyamine may incorporate the functional groups as discussed above. However, as polyamines inherently incorporate amine functionality in their chain structures and hence are inherently water soluble, it is not essential that the polyamines incorporate such polar functional groups as substituents.

The oil incorporated in the composition should be substantially immiscible with the polymer and substantially inert with respect to the polymer. Thus, the polymer should not dissolve in the oil and the oil should not be imbibed by the polymer or otherwise swell the polymer particles under normal room temperature conditions of storage and handling. Also, there should not be any appreciable chemical reaction between the oil and the polymer under standard room temperature storage and handling conditions. Thus, the oil included in the composition may include one or more aliphatic hydrocarbons or aromatic hydrocarbons. Desirably, the aliphatic or aromatic hydrocarbons incorporated in the oil have 8 to 18 skeletal carbon atoms The oil may also incorporate one or more hydrocarbon ethers, hydrocarbon esters and monohydroxylic hydrocarbon alcohols. Diols such as ethylene glycol and polyols are generally undesirable in that they tend to interact with the polymers. Among the hydrocarbon esters which may be employed are the aliphatic alcohol esters of aliphatic acids. Preferably, these esters have a total carbon content greater than 8 carbon atoms. Among the hydrocarbon ethers which may be used are the symmetrical and asymmetrical aliphatic and aromatic ethers, suitably of total carbon content of less than 18 carbon atoms. Among the monohydroxylic alcohols which may be employed are those incorporating hydrocarbon chains of 1 to 18 carbon atoms. The term "monohydroxylic alcohol" means an alcohol having a single hydroxyl substituent on the chain. Preferably, the oil has a relatively low volatility, relatively low viscosity and relatively high flash point. Also, the oil desirably is substantially nontoxic. Particularly useful are the aliphatic oils sold by The Exxon Corporation under the names of Isopar H, Isopar M and Low Odor Paraffin Solvent (LOPS). Other useful oils are sold by the American Mineral Spirits Company under the designations OMS and petroleum naphthas.

The polymer is present in the oil as particles admixed with the oil. Desirably, the polymer particles have a mean particle size less than about 100 microns, preferably about 0.03 to about 20 microns and most preferably about 0.1 microns to 8 microns. The polymer particles preferably are substantially evenly dispersed in the oil. The polymer in the particles should be substantially dry. As used in this disclosure with reference to a water soluble polymer and with reference to particles of such a polymer, the term "substantially dry" means that the polymer has a water content low enough that the particles of the polymer are substantially stabilized against agglomeration and coagulation with one another. However, the term "substantially dry" does not imply the total absence of water, dissolved or adsorbed in or on the polymer or otherwise incorporated therein. Preferably, the total water content of the polymer is less than about 15% based on the total weight of the polymer including any water dissolved therein, adsorbed thereon or otherwise incorporated with the polymer. More preferably, the water content of the polymer is less than about 10% on the same basis and most preferably about 3% to 8%.

The polymer particles and preferably the oil as well in this dispersion are substantially free of surfactants. As used in this disclosure, the term "surfactant" refers to a substance which will emulsify an oil such as an aliphatic $C_8$ hydrocarbon in water, or water in such a hydrocarbon oil. The term "substantially free of surfactants" as used herein means that no appreciable, effective amount of surfactant is present. Desirably, the composition contains less than about 2% surfactants, and more desirably less than about 0.5% surfactants by weight. Even more preferably, the surfactant content may be less than 0.1% and most preferably less than 0.01%. Although the flocculant polymers discussed above exhibit surface active properties in some circumstances, they are normally not "surfactants" as the term is used in this disclosure. Despite the substantial absence of surfactants in the preferred compositions, the compositions normally have excellent shelf life and resist settling of the polymer particles. Thus, the polymer particles typically remain substantially evenly dispersed within the oil during several months of storage under normal, room temperature conditions. Even where some settling does occur, the polymer particles are substantially resistant to agglomeration. Therefore, the polymer particles can be resuspended readily by gentle stirring or other like agitation if settling has occurred. Desirably, the polymer particles amount to about 20% to about 85% of the composition by weight. More preferably, the polymer particles constitute between about 50% and about 75% of the composition by weight. The remainder of the composition is constituted by the oil. The compositions in accordance with this embodiment desirably are substantially free flowing despite the relatively high concentration of solid polymer particles. Typically, the compositions can be handled by common, industrial fluid handling techniques, using ordinary piping, pumps, valves and the like. Compositions in accordance with this embodiment of the invention desirably are stored in sealed containers for protection against atmospheric moisture. Where the composition is handled in normal industrial quantities, ordinary industrial packaging and handling methods such as storage in closed cans, drums, tanks and transport vessels with moderate headspace provide sufficient protection against atmospheric moisture. It is usually not necessary to flush the container headspaces with a dry inert gas, although such precautions can be used.

In a method of dissolving a flocculant polymer in an aqueous fluid according to a further embodiment of the invention, a dispersion in accordance with the foregoing embodiment of the invention is admixed with the aqueous fluid. It is unnecessary to add any surfactant to the aqueous fluid or to the composition to promote dispersion. Desirably, neither the aqueous fluid nor the composition contain any effective amount of a water-in-oil or oil-in-water surfactant and no extraneous surfactant is added to either the composition or the aqueous fluid before or during the admixing step. Thus, the admixing step is performed in the substantial absence of surfactants. The inherently good dispersability of compositions according to preferred embodiments of the invention provides rapid and complete dissolution of the flocculant polymer in the aqueous fluid without the use of any such surfactants in the system. As no surfactants are employed, surfactant contamination of the aqueous fluid does not present a problem. Dissolution of the polymer in the aqueous fluid may be enhanced by agitating the composition and the aqueous fluid during the admixing step, as by a common industrial mixer or the like. The time required for dissolution of the polymer or the degree of agitation required to achieve dissolution in any particular time will depend in part upon the quantities of polymer to be dissolved, the quantity of aqueous fluid and other conditions such as temperature, viscosity of the fluid and the like. However, under comparable conditions, compositions and methods according to the invention typically provide dissolution speed equal to or better than that provided by comparable compositions and methods employing surfactants in the polymer composition, in the aqueous fluid or both.

The method may be applied to dissolution of a flocculant polymer in a wide variety of aqueous fluids. Typically, flocculant polymers are added to fluids such as oil well injection water, oil well drilling muds, papermaking stock, sewage and industrial wastes. The method may be employed with any of these as well as with substantially pure water and with aqueous solutions of other water soluble materials. Where the fluid is a suspension of water soluble particles in an aqueous medium, and where flocculation is desired, as in processing of sewage and industrial wastes, the composition is added to the suspension in an amount sufficient to promote flocculation of the insoluble particles. The amount of various polymers required to provide particular effects with various aqueous solutions are well known. Typically, the composition in accordance with the invention is added in amounts sufficient to provide the same amounts of polymer as where the polymer is dissolved by conventional means.

A method of making a composition as aforesaid in accordance with a further embodiment of the invention starts from the monomer. The monomer or monomers used as starting materials are selected according to the criteria discussed above in connection with the composition so as to provide a polymer as described above. The monomer is dissolved in an aqueous phase and the aqueous phase is emulsified in a first oil with a first surfactant which is a water-in-oil emulsifier. Where the monomer is an ethylenically unsaturated monomer used to form a vinyl polymer, a free radical yielding initiator typically is added to the emulsion either in the aqueous phase or in the oil phase. Under these conditions, the monomer polymerizes to yield particles of the polymers as described above. The particle size of the polymer is controlled principally by the fineness of the emulsion. Conditions and procedures for water-in-oil polymerization of ethylenically unsaturated monomers are well known to those skilled in the art. Thus, this step of the present method may employ the techniques taught in Vanderhoff et al., U.S. Pat. No. 3,284,393, the disclosure of which is hereby incorporated by reference.

Where a polyamine is to be formed, the monomer typically is a di-amine and a di-functional linking agent is present in one of the phases of the emulsion. Suitable linking agents and water-in-oil polymerization techniques for synthesis of polyamines are disclosed in U.S. Pat. No. 4,052,353 of Clyde S. Scanley, the disclosure of which is hereby incorporated by reference herein. Preferred linking agents are epihalohydrins and alkyl dihalides. The first oil used as the oil phase of the polymerization emulsion desirably is a water immiscible oil selected from among the oils mentioned above in connection with the composition. The emulsion polymerization step results in a latex or dispersion, referred to herein as the "precursor dispersion" having an aqueous phase containing the polymer together with a substantial amount of water, and also containing the first surfactant or water-in-oil emulsifier.

In the next step of the process, water is removed from the aqueous phase of the precursor dispersion to provide a first dispersion containing substantially dry polymer particles dispersed in the first oil. Preferably, the water is removed from the precursor dispersion by evaporation. The evaporation techniques taught in the aforementioned U.S. Pat. No. 4,052,353 of Clyde S. Scanley may be employed for this step. Removal of water desirably is continued until the polymer particles have reached the preferred moisture contents discussed above in connection with the composition. This stage of the process yields a first dispersion incorporating a substantially dry polymer particles dispersed in the first oil originally used in the polymerization stage, together with the first surfactant remaining from the polymerization stage.

In the next stage of the process, this first dispersion is converted to a second dispersion incorporating the polymer particles in an oil, the second dispersion being substantially free of surfactants. Preferably, the conversion step is performed by separating the first oil and first surfactant from the polymer particles and forming the second dispersion by dispersing the separated polymer particles in a second oil. The step of separating the polymer particles from the first oil and surfactant may include one or more physical separation steps such as centrifugation, filtration and the like. Further, the polymer particles which are physically separated from the first oil may be washed with a wash liquid to remove residual surfactant from the polymer particles. The wash liquid may be an oil, such as an oil as discussed above in connection with the composition. Where the physical separation is performed by filtration, the wash liquid may be passed through the polymer particles collected on the filter, or else the polymer particles collected by filtration may be dispersed into the washing liquid and then recollected by further filtration. Where centrifugation is employed, the polymer particles collected by centrifugation normally are redispersed in the wash liquid and collected once again by further centrifugation. The polymer particles, after physical separation and washing, are redispersed in the second oil to provide the finished composition.

The second oil may be any of the oils discussed above with reference to the composition. The second oil may be a different oil than the first oil. For example, where a water immiscible first oil is employed in the polymerization operation, the second oil may be a water miscible oil such as a monohydroxylic alcohol. Preferably, the first oil separated from the polymer particles during the separation stage of the process is recycled back to an earlier stage of the process. Thus, the first oil may be used once again in the polymerization step. The first oil separated during the separation stage ordinarily contains the major portion of the surfactant or water-in-oil emulsifier. Thus, the surfactant is returned to the polymerization stage and reused along with the first oil when the process is repeated to make more of the composition. The process steps employed in manufacture of the composition may be performed with conventional chemical processing equipment, and may be carried out either on a batch or continuous basis.

Dispersions including an aqueous, polymer-bearing phase, an oil and a surfactant, corresponding to the precursor dispersion discussed above are commercially available in a modified version of the manufacturing process. Such a commercially available dispersion is employed as a starting material. The process using such a commercially available wet polymer dispersion is the same as described above except that the polymerization step is omitted. Also, dispersions of substantially dry polymer particles in oil, corresponding to the first dispersion mentioned above are commercially available as well. These may be used as starting materials in a further modified version of the manufacturing process wherein both the polymerization and the drying steps are omitted and the step of providing the first dispersion is performed by providing such a commercially available dispersion.

Numerous further variations and combinations of the above features can be employed. Thus, the precursor dispersion can be formed by dissolving a pre-existing polymer in water and emulsifying this solution with the first oil. Also, the first dispersion containing the dry polymer particles can be converted to a second dispersion through means other than the physical separation procedures discussed above. Some surfactants, typically long-chain surfactants containing reactive moieties within the chain degrade into small, non-surfactant molecules during storage or upon exposure to heat or electromagnetic radiation such as ultra violet radiation and gamma irradiation. Where these surfactants are employed, the first dispersion containing the surfactants may be converted into the second, surfactant-free dispersion by exposing the first dispersion to the appropriate heat or radiation. The residues remaining upon degradation of the surfactants may remain in the dispersion or else may be removed by distillation. Other surfactants undergo similar degradation processes upon addition of suitable co-reactants and thus the conversion step may involve addition of these co-reactants.

The dissolution characteristics of a flocculant polymer composition may be tested by the following procedure: A standard 600 ml laboratory beaker is filled with 400 ml of distilled water at 80° F. (26.6° C.). A 2 inch (5 cm) magnetic stirring bar is placed in the beaker and the stirring speed is adjusted to yield a vortex of approximately ¾ inch (19 cm) diameter at the level of the stirring bar (the bottom of the beaker). 0.8 ml of the composition is added en masse to the vortex. Samples of the mixture are withdrawn periodically in a viscosity cup having an orifice at the bottom, and the efflux time is recorded as the viscosity in empirical units. The specific viscosity [is] Nsp is calculated according to the formula:

$$Nsp = \frac{(\text{Viscosity of Mixture}) - (\text{Viscosity of Water})}{(\text{Viscosity of Water})}$$

As the polymer in the composition dissolves in water, the viscosity of the mixture increases, so that successive samples typically show progressively higher viscosity and progressively higher specific viscosity. The procedure is continued until the viscosity stabilizes. The specific viscosity at this point is taken as the ultimate specific viscosity. The dissolution time referred to in this disclosure is taken as the time after addition of the composition required for the specific viscosity in the aforementioned empirical units to reach 50% of the ultimate specific viscosity.

The following non-limiting examples illustrate certain aspects of the present invention.

EXAMPLE I

Purification of Polymer

A commercial product known as Amerfloc 5270 is an approximately 70/30 copolymer of acrylamide/acrylic acid prepared by the inverse emulsion (water-in-oil, W/O) technique of Vanderhoff and then dried to give a suspension of water soluble polymer particles in a liquid composed of hydrocarbon plus the emulsifier used for polymerization. To this mixture is added what has been called an "activator" or "inverter", namely, a surfactant that is needed to give the mixture dispersibility and solubility in water.

Emulsifier and "activator" were cleaned from a 50 g. sample of Amerfloc 5270 by diluting with 200 ml. of Isopar H, heating to 80° C. and centrifuging at approximately 4500 G (8" radius, 4500 rpm) for 15 minutes. The centrifuge cake was washed four times more by suspending it each time in 200 ml. of Isopar H at 80° C. and centrifuging as before. The final centrifuge cake was suspended in Isopar H to give a product containing 30% cleaned dry polymer, designated Product "A".

EXAMPLE II

Dissolvability Testing

The dissolvability of "A" was determined by the aforementioned standard dissolution test. The results are as given in Table 1.

TABLE 1

Rate of Solution of Product "A"

| Time after Addition Min. | Viscosity, Efflux Time Sec. | Nsp | % of Ultimate Specific Viscosity Nsp Reached at Indicated Time |
|---|---|---|---|
| 0 (dist. w.) | 13.30 | — | — |
| 3 | 28.24 | 1.12 | 66 |
| 10 | 31.65 | 1.34 | 80 |
| 21 hours | 35.78 | 1.69 | 100 |

These results indicate that the dissolution time to reach 50% of ultimate specific viscosity Nsp is less than 3 minutes for Product "A".

EXAMPLE III

Effect of Emulsifier

The harmful effect of emulsifier is shown using Span 80, (sorbitan monooleate), a commonly used emulsifier in Vanderhoff type water-in-oil polymerizations. Span 80 was added to a sample of "A" so that the concentration of Span 80 in the mixture was 5% based on contained polymer. The dissolving rate of the mixture was determined by the same standard test procedure as used in Example II. The results are shown in Table 2.

TABLE 2

Inhibiting Effect of Emulsifier on Solubility

| Time after Addition Min. | Viscosity Seconds | Nsp | % of Ultimate Specific Viscosity Nsp Reached | |
|---|---|---|---|---|
| | | | "A" + 5% Span 80 | "A" from Table I |
| 0 (dist,W) | 13.3 | — | — | — |
| 2 | 14.9 | 0.12 | 7 | — |
| 3 | 15.8 | 0.19 | 11 | 66 |
| 10 | 17.1 | 0.29 | 17 | 80 |

The viscosity of the solution containing the Span 80 treated "A" did not appear to increase significantly after ten minutes. The time to reach 50% of ultimate viscosity was substantially greater than 10 minutes. By comparison of viscosity at identical times with the corresponding solution including Product A (without Span 80), it is apparent than Span 80 had a large adverse effect. This effect is even greater in the case where a Vanderhoff latex is prepared and an attempt is made to dissolve it directly rather than as above, where an amount of emulsifier is added to cleaned polymer. When direct dissolution of a Vanderhoff latex is attempted, there usually appears to be no dissolution at all.

EXAMPLE IV

Effect of Other Emulsifiers

Experiments with other emulsifiers were carried out at the 5% on polymer level as in Example III and the results are summarized in Table 3 below.

TABLE 3

Comparison of Inhibiting Effect of Emulsifiers

| Time after Addition Min. | % of Ultimate Nsp Reached at Indicated Time | | | | |
|---|---|---|---|---|---|
| | "A" (from Table 1) | A + 5% Pluronic L-121 | A + 5% BRIJ-92 | A + 5% Triton X-15 | A + 5% Span-80 |
| 3 | 66 | 25 | 51 | 37 | 11 |
| 10 | 80 | 27 | 59 | 45 | 17 |

EXAMPLE V

Effect of Emulsifier Concentration

A series of experiments was carried out to determine the effect of concentration of emulsifier on dissolving rate.

Samples of "A" were dosed with Span 80 at 0.72, 1.43 and 2.86% levels based on contained polymer. These samples and "A" were run in a dissolving test as follows. To a 600 ml. beaker was added 400 ml. of tap water at 78° F. (25.5° C.) and a 2 inch (5 cm) magnetic stirring bar. Stirring rate was adjusted to give a ¾ inch (19 cm.) vortex at stirring bar level and a 1.07 ml. sample of polymer suspension was added. Viscosities were determined by removing a sample with a pipette and measuring pipette efflux time. The specific viscosity Nsp was calculated by the same formula as employed in the standard test. After 2½ hours of stirring the specific viscosities were shown in Table 4.

TABLE 4

Effect of Emulsifier Concentration on Dissolving Rate

| Treatment of Samples | Nsp | Nsp of Treated Sample Relative to "A" |
|---|---|---|
| None (Product "A") | 1.93 | |

TABLE 4-continued

Effect of Emulsifier Concentration on Dissolving Rate

| Treatment of Samples | Nsp | Nsp of Treated Sample Relative to "A" |
|---|---|---|
| 0.72% Span 80 | 1.23 | 64% |
| 1.43 Span 80 | 1.04 | 54% |
| 2.86 Span 80 | 0.67 | 35% |

As concentration of emulsifier increases, the rate of solution becomes slower and slower.

EXAMPLE VI

Samples of "A" and "A" plus emulsifier that were made up for dissolving rate tests in Table 3 were also examined for viscosity and resistance to settling. "A" was found to be remarkably low in viscosity in comparison with the treated materials, which was unexpected, as it also showed better resistance to settling. All of the samples were stored in bottles at room temperature and examined over a period of time. The results are shown in Table 5.

TABLE 5

Effect of Emulsifier Concentration on Resistance to Settling

| Treatment | Storage Time, Months | % Supernatant Liquid |
|---|---|---|
| None ("A") | 11 | 2 |
| Span 80 0.72% | 4 | 45 |
| BRIJ-92 0.50% | 3 | 25 |
| Triton X-15 0.50% | 3 | 25 |

The settled material in the emulsifier treated samples in each case was packed quite hard and was difficult to disperse.

EXAMPLE VII

Removal of Surfactants from Commercial Cationic Polymers

Colloids 767 (manufactured by Allied Colloids, Inc. of Suffolk, Va.) is reported to be a cationic copolymer containing 55% acrylamide and 45% methacrylamido-ethyl-trimethyl ammonium-chloride that has been prepared by the Vanderhoff process, dried and formulated with activating surfactant. A sample of Colloids 767 was cleaned of emulsifier and "activator" as in Example I, formulated as a 62% solids suspension in Isopar H, and designated Product "B". Span 80 was added to one portion of "B" at 1% based on contained polymer and the treated and untreated materials were run in dissolving tests according to the procedure in Example II. The results are shown in Table 6.

TABLE 6

Inhibiting Effect of Emulsifier on Product "B"

| Dissolving Time Min. | "B" | Nsp "B" + Span 80 | NSP of Treated Sample Relative to "B" |
|---|---|---|---|
| 7 | 0.70 | 0.22 | 31% |
| 12 | 2.21 | 0.49 | 22% |
| 20 | 2.38 | 0.88 | 37% |

EXAMPLE VIII

Synthesis of Polymer

A polymer is prepared according to Example II of Vanderhoff et al., U.S. Pat. No. 3,284,393, but substituting diallyldimethyl ammonium chloride for vinylbenzyl trimethyl ammonium chloride. The polymerized latex is diluted with an additional 200 g. of xylene and subjected to vacuum distillation/dehydration to give a 200 ml. suspension of dry polymer in liquid (xylene+sorbitan monooleate). This suspension is centrifuged at approximately 4500×gravity (8" radius, 4500 rpm) for 15 minutes and the supernatant liquid is decanted. The resulting filter cake is washed four more times by slurrying in 200 ml. of Isopar H at 60° C. and centrifuging as before. The final cleaned cake is suspended as a 60% concentrate in Isopar H.

EXAMPLE IX

Synthesis of Polymer

A poly (sodium 2-sulfoethyl acrylate) latex is prepared according to Example 4 of Vanderhoff et al., U.S. Pat. No. 3,284,393, diluted with 200 ml. of xylene and vacuum distilled/dehydrated to give a dispersion of dry polymer which still contains the sorbitan monostearate surfactant used in the polymerization step. A 20 g. sample of this suspension is filtered on a membrane filter and washed with four successive 30 ml. portions of xylene and one 30 ml. portion of LOPS. The wet filter cake is then suspended in LOPS to give a 65% concentrate of polymer substantially free of the surfactant.

EXAMPLE X

Synthesis of Polymer

An acrylamide homopolymer is prepared according to Anderson U.S. Pat. No. 3,826,771 (Example I) using the following recipe:

| Grams | Ingredient |
|---|---|
| 50 | Isopar M |
| 2 | Sorbitan Monostearate |
| 50 | Water |
| 42 | Acrylamide |
| 0.08 | 2,2'-azobis (isobutyronitrile) |

To the finished latex is added 200 ml. of Isopar M and the mixture is vacuum distilled/dehydrated to give a suspension of dry polymer in a liquid composed of Isopar M and sorbitan monostearate. The suspension is diluted with Isopar H to give a 10% suspension and a 30 g. sample of this suspension is filtered on a membrane filter and washed with four 20 ml. portions of Isopar at 60° C. The resultant wet filter cake is taken up in Isopar M to make a suspension containing 65% polyacrylamide and substantially free of the sorbitan monostearate surfactant.

What is claimed is:

1. A method of making a water dispersible mixture of a water soluble polymer in an oil comprising the steps of:
   (a) providing a first dispersion of particles of said polymer in a first oil substantially immiscible with said polymer, said first dispersion incorporating a first surfactant, said polymer particles in said first dispersion being substantially dry; and
   (b) converting said first dispersion to a second dispersion of said polymer particles in an oil immiscible with said polymer, said second dispersion having a lower surfactant content than said first dispersion.

2. A method as claimed in claim 1 wherein said converting step includes the steps of separating said polymer particles from said first oil and first surfactant and dispersing said separated polymer particles in a second oil.

3. A method as claimed in claim 2 wherein said separating step includes the step of washing said separated polymer particles with a wash liquid immiscible with said polymer prior to said step of dispersing said polymer particles in said second oil.

4. A method as claimed in claim 2 wherein said step of providing said first dispersion includes the steps of providing a precursor dispersion comprising an aqueous phase containing said polymer, said first oil and said first surfactant and removing water from said aqueous phase of said precursor dispersion.

5. A method as claimed in claim 4 further comprising the step of returning said first oil containing said first surfactant from said separating step to said step of providing said precursor dispersion whereby first oil and surfactant from said first oil separation step are reused as constituents of said precursor dispersion.

6. A method as claimed in claim 5 wherein said step of providing said precursor dispersion includes the step of forming an emulsion comprising an aqueous phase containing a monomer dispersed in said first oil together with said first surfactant and polymerizing said monomer in said aqueous phase to thereby form said precursor dispersion, said step of returning said first oil to said emulsion-providing step including the step of returning said first oil containing said first surfactant to said step of forming said emulsion.

7. A method of dissolving a water soluble polymer in an aqueous fluid comprising the step of admixing a composition and an aqueous medium, said composition comprising an oil and particles of a solid, water soluble flocculant polymer immiscible with said oil, said polymer particles being dispersed in said oil, said polymer particles being substantially dry and having a mean particle size less than about 100 microns, said composition being substantially free of surfactants.

8. A method as claimed in claim 7, wherein said composition has a surfactant content less than about 0.1%.

9. A method as claimed in claim 7, wherein said composition has a dissolution time to reach 50% of ultimate specific viscosity less than about 30 minutes.

10. A method as claimed in claim 9, wherein said polymer is selected from the group consisting of vinyl polymers having polar functional groups and polyamines.

11. A method as claimed in claim 9 wherein said polymer is selected from the group consisting of homopolymers and copolymers of acrylamide.

12. A method as claimed in claims 7, 9, 10 or 11 wherein neither said aqueous fluid nor said composition contains any effective amount of surfactants and wherein no surfactant is added either to said composition or to said aqueous fluid before or during said admixing step.

13. A method as claimed in claim 12 wherein said admixing step includes the step of agitating said composition and said acqueous medium.

14. A method as claimed in claim 7, 9, 10 or 11 wherein said aqueous fluid is a suspension of water-insoluble particles in an aqueous medium and said composition is added to said suspension in an amount sufficient to promote flocculation of said insoluble particles.

15. A method as claimed in claim 7, 9, 10 or 11 wherein said aqueous medium is selected from the group consisting of oil well injection water, oil well drilling mud, paper making stock, sewage and industrial wastes.

16. A method as claimed in claim 1 wherein said second dispersion is substantially free of surfactants.

17. A method as claimed in claim 1 wherein said second dispersion has a surfactant content less than about 0.1%.

* * * * *

UNITED STATES PATENT AND TRADEMARK OFFICE
CERTIFICATE OF CORRECTION

PATENT NO. : 5,250,586

DATED : October 5, 1993

INVENTOR(S) : Clyde S. Scanley

It is certified that error appears in the above-identified patent and that said Letters Patent is hereby corrected as shown below:

Column 5, line 33, after "atoms" insert --.--.

Signed and Sealed this

Twenty-sixth Day of April, 1994

Attest:

BRUCE LEHMAN

Attesting Officer   Commissioner of Patents and Trademarks